United States Patent [19]

Arthur

[11] 3,964,680

[45] June 22, 1976

[54] RAILROAD SPIKE RETAINER

[76] Inventor: David M. Arthur, 4020 N. 14th Ave., Phoenix, Ariz. 85013

[22] Filed: Feb. 3, 1975

[21] Appl. No.: 546,264

[52] U.S. Cl. .................................. 238/366; 85/21; 85/24; 238/371
[51] Int. Cl.² ............................................ E01B 9/12
[58] Field of Search .................. 238/310, 366, 371; 85/10 R, 21, 23, 24, 25, 63, 82, 83

[56] References Cited
UNITED STATES PATENTS

| | | | |
|---|---|---|---|
| 942,693 | 12/1909 | Wintermute | 85/33 X |
| 1,118,431 | 11/1914 | McKently | 85/21 X |
| 1,855,329 | 4/1932 | Wagner | 85/21 X |
| 2,719,452 | 10/1955 | Jones | 238/371 X |

FOREIGN PATENTS OR APPLICATIONS

| | | | |
|---|---|---|---|
| 253,534 | 6/1927 | Italy | 238/371 |

*Primary Examiner*—Robert J. Spar
*Assistant Examiner*—Randolph A. Reese
*Attorney, Agent, or Firm*—Cahill, Sutton & Thomas

[57] ABSTRACT

A railroad spike retainer is disclosed which may be driven into a railroad tie together with the spike it retains. The retainer exerts a retention force both against the spike to prevent its regression from the retainer and also against the tie to prevent the regression of the retainer itself from the tie.

9 Claims, 4 Drawing Figures

3,964,680

RAILROAD SPIKE RETAINER

FIELD OF THE INVENTION

This invention relates to the fastening of railroad rails to supporting ties, and more particularly, to retaining a spike in its driven position in a tie.

BACKGROUND OF THE INVENTION

The railroad industry has long been plagued by the problem of loose rails along the roadbeds. Although the rails are secured to cross-ties by driving headed spikes into the ties to contact the flanges of the rails, loose rails may still result from several factors. First, the movement of the railroad engine and loaded cars along the rails produces a wave-like motion in the rails. This motion in unavoidable because railroad engines and cars are extremely heavy and their weight is concentrated on a very small area under each wheel at the rail. As a result, as a loaded train moves along the rail, a particular point on the rail will be alternately subjected to an extremely high load when a wheel is directly on that spot, followed by a period when that spot is subjected to no load when it is between the wheels of the train. This wave-like loading pattern produces an undulating force which tends to pull the spike loose from its tight fitting position between the flange of the rail and the tie. The upward force on the head of the spike eventually causes it to back out of the hole in the tie. This creates a situation in which the rail is free to move somewhat in a vertical plane in response to the wave motion. This looseness further compounds the problem since the rail now is free to undulate even more as the load of a moving train progresses down its length. This undulation exaggerates the force, creating an upward pull on the head of the spike. Eventually, sufficient looseness results that the hazard of derailment is created because of the degree of movement permitted by the loose spike.

In addition to the effects of the rolling load along the rail, spikes are subjected to a lifting force because of variations in the roadbed. Heaving in the roadbed due to freezing conditions or because of drainage problems creates uneven support beneath the cross ties. This permits one rail or the other to shift out of alignment with the opposite rail. Because both rails are no longer in the same horizontal plane, a moving railroad locomotive and its loaded cars will sway from side to side as it passes the misaligned region of the rails. This swaying movement exerts an outward force on the spike holding each rail. The lateral force on the top of the rail tends to rock the rail or cause it to rotate about its base flange. This rocking motion of the rail tends to lift the head of the spike which is positioned over the top of the outside web of the rail flange.

Early attempts to solve this problem resulted in the use of threaded spikes which were twisted into the wooden tie and positioned to hold down the rail. This solution introduced significant expense in laying a roadbed because of the greater labor involved in inserting a threaded spike as opposed to a driven spike. Not only that, the solution was not particularly effective because a secondary problem was introduced. Threaded spikes produced a very tight connection between the components of the railbed. Although at first glance, this would seem to be a beneficial arrangement, it in fact is a very unsatisfactory arrangement. Because of the exceptionally high loads encountered with a rolling railroad engine and its load, the connection at the spike must be somewhat resilient or flexible. If this connection is rigid, the effects of the load are concentrated at the head of the spike and produce working stresses that eventually cause the fracture of the spike and the complete loosening of the rail.

It is therefore an object of my invention to produce a secure, yet resilient retainer for a railroad spike.

Another solution to the problem of loosening railroad spikes has been the use of a locking insert placed between the spike and the tie. Such methods or apparatus were disclosed in the following United States patents:

| Inventor | Date | Patent Number |
| --- | --- | --- |
| W. D. Forsyth | Aug. 13, 1907 | 862,898 |
| G. B. Cutting | Feb. 18, 1919 | 1,294,778 |
| G. B. Cutting | Apr. 3, 1923 | 1,450,280 |
| R. D. Wagner | Apr. 26, 1932 | 1,855,329 |
| H. T. Jones | Oct. 4, 1955 | 2,719,452 |
| N. K. Moses | June 29, 1965 | 3,191,864 |

Each of the above references provided means for securing the insert to the tie. However, none of the disclosed methods or apparatus produced any locking or retaining force on the spike itself. The possible exception to this is the alternative structure disclosed by the Wagner reference. However, the alternative structure disclosed by the Wagner reference, as well as the Jones reference, require the use of specially shaped spikes. Because these references require the use of special spikes, the apparatus of both references would be inapplicable to presently designed spikes and would create problems of inventory, compatibility and interchangeability with the existing roadbed apparatus.

Therefore, it is another object of my invention to provide a railroad spike retainer which applies a restraining force to the spike in excess of a frictional force.

It is yet another object of my invention to provide a railroad spike retainer which is effective to restrain spikes of standard configuration.

An additional problem arises in the use of any of the above cited patents. Each of the disclosed inserts must be separately inserted into a hole. As a result, a separate hole drilling operation must be undertaken, followed by the insertion of the retaining insert, after which the spike can be driven into the insert. The extra operations of drilling the hole and placing an insert in the drilled hole increases significantly the labor involved in putting down the roadbed compared with the cost of producing such a roadbed using driven spikes.

It is a further object of my invention to provide a railroad spike retainer which may be positioned simultaneously with the driving of the spike to be retained into the tie.

These and other objects and features of my invention can be more readily understood by reading the following detailed description in conjunction with the drawing.

SUMMARY OF THE INVENTION

A rail holding spike is resiliently retained in the rail supporting cross-ties by a retainer having a portion harder than the spike which may be driven into the tie simultaneously with the spike. The retainer includes a plurality of louvers horizontally positioned to increase the retaining force on both the spike and tie in response to any receding movement of the spike.

DETAILED DESCRIPTION OF THE ILLUSTRATIVE EMBODIMENT

Figure 1:
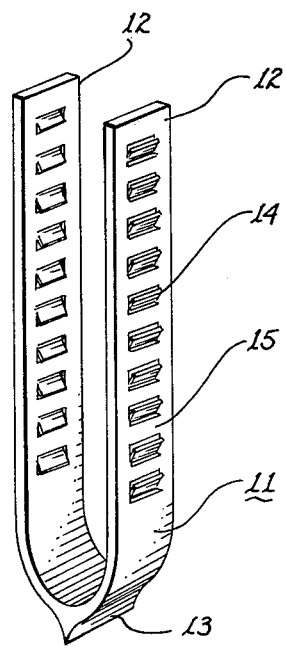
FIG. 1 is a perspective view of a retainer embodying my invention.
Figure 3:
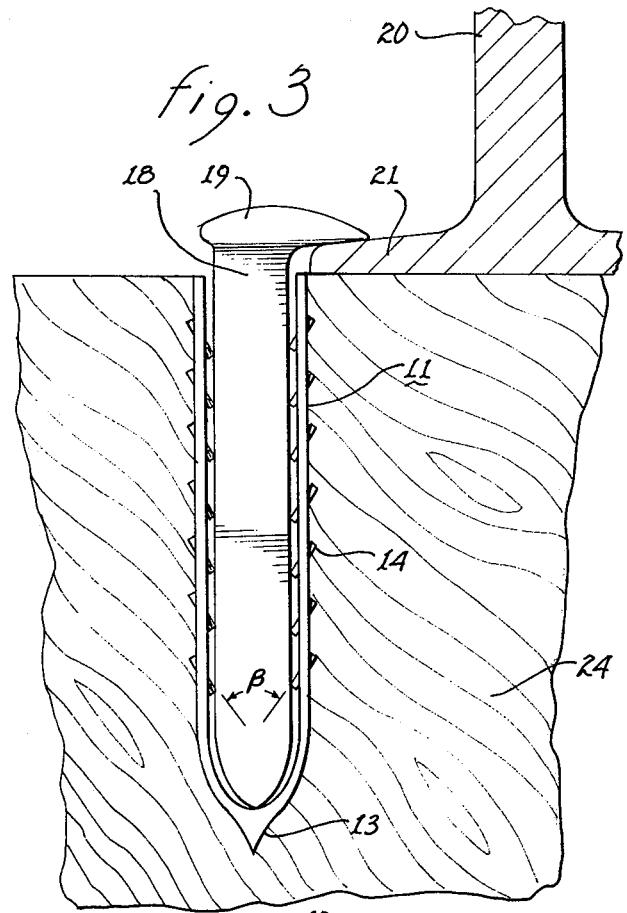
FIG. 3 is a cross-section view of the retainer shown in FIG. 1 positioned to secure a rail holding spike into a cross-tie.
Figure 2:
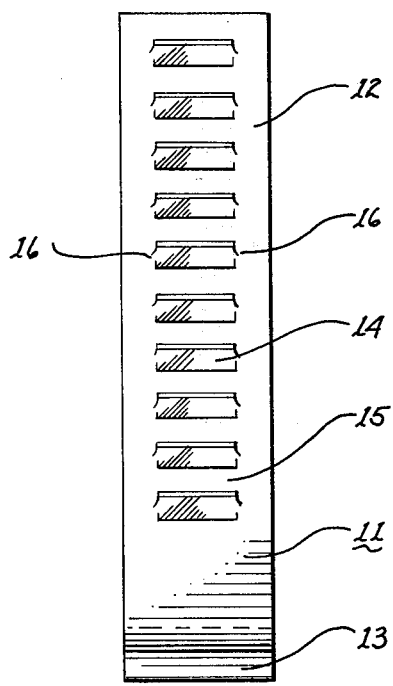
FIG. 2 is an elevation view of the retainer shown in FIG. 1.

A locking insert 11 in accordance with my invention is shown in FIG. 1. Insert 11 includes a pair of upright legs 12 joined by an anvil web 13 having a thickened or reinforced cross-section from that of upright legs 12 and having a ridged edge. As can be seen in FIG. 2, each upright leg 12 is generally planar and includes a plurality of locking louvers 14 laterally positioned along its length. FIG. 3 shows, in cross-sectional view, an insert 11 which has been driven into a cross-tie 24 by spike 18. Spike 18 has a head 19 which is secured against the flange 21 of the rail 20, thereby securing the rail to cross-tie 24. Insert 11 is driven into tie 24 by the end of spike 18 which transmits the impulse forces applied to head 19 to the anvil web 13 thereby forcing the ridged edge to penetrate cross-tie 24.

Figure 4:
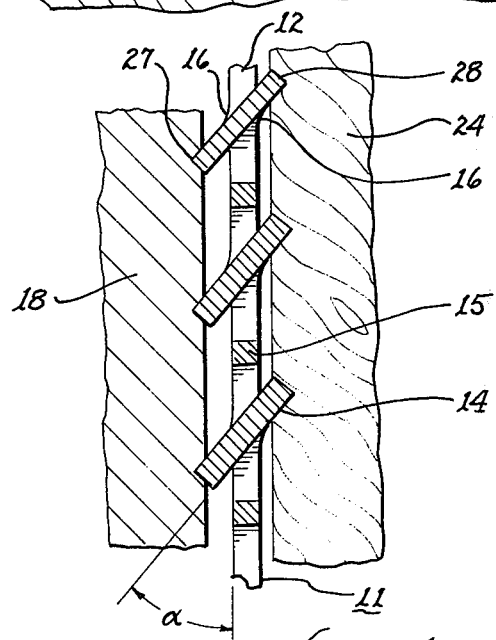
FIG. 4 is a partial enlarged cross-sectional view of the retainer of FIG. 1 shown at the interface between the retainer and the edges of the spike and the tie.

The locking louvers 14 are shown in detail in the enlarged cross-sectional view of FIG. 4. As can be seen, the locking louvers 14 are positioned at an angle to the upright leg 12. The bottom portion of louver 14 includes a pointed lower edge 27 adapted for deforming and engaging the surface of spike 18. The upper end of louver 14 includes a penetrating upper edge 28 adapted for deforming and making contact with cross-tie 24. Louvers 14 are connected to upright leg 12 by a connector 16 at each end of the louver in such a way that rotation of louver 14 relative to leg 12 is resisted in either direction. However, it can be observed that a lesser resisting force will be imposed on louver 14 as the insert moves downward in FIG. 4 relative to cross-tie 24 than would a corresponding upward movement of insert 11. Similarly, less resisting force may be produced by the downward motion of spike 18 relative to insert 11 in FIG. 4 than would a corresponding upward movement of the spike. Thus, the spike may be driven into insert 11 and the insert in turn driven into cross-tie 24 while producing only a moderate rotational force on louver 14 relative to the insert 11.

Once insert 11 and spike 18 have reached their fully inserted position on being driven into tie 24, the force within connectors 16 which tended to resist the rotation of louver 14 will cause the louvers to penetrate both the tie 24 and spike 18. For example, edge 27 will deform the surface of spike 18 and embed itself slightly into the spike. Similarly, penetrating end 28 will cut into tie 24. Thus, it can be seen that simultaneously louver 14 will produce a retaining force both between spike 18 and the retainer 11, and between the retainer and tie 24.

Any force on spike 18 which would tend to cause a withdrawing movement of the spike would produce an upward movement as shown in FIG. 4. Any upward movement of spike 18 would cause louver 14 to experience a rotating force in a clockwise direction. This would simultaneously embed pointed end 27 even deeper into spike 18 and cause penetrating end 28 to move even deeper into tie 24. It should be borne in mind that a similar action would take place on the other side of spike 18 coincidental with the movement and forces exerted on the leg shown in FIG. 4. As a result, despite a lateral force being exerted against the surface of spike 18 in FIG. 4, no movement laterally of the spike would occur due to an equal and offsetting force being exerted on the opposite face of the spike. However, this lateral force would be effective to force pointed end 27 deeper into the surface of spike 18, thereby increasing the retaining effect of insert 11 on spike 18. As a result of the forces produced laterally on the spike by the upward movement of the spike, any movement which might tend to permit spike 18 to back out of its inserted position will automatically result in an increase in the retention force being applied against the spike, and concurrently against tie 24.

If the above description is considered in accordance with FIGS. 3 and 4, it can be readily understood that the angle between louver 14 and the planar portion of leg 12 is most important. Although the interaction of leg 12, connectors 16 and louvers 14 will be effective at almost any angle, the optimum result will be obtained where the included angle between a louver in each leg is less than 90° following positioning of spike 18 within insert 11. Louvers 14 could be initially positioned perpendicular to the planar portion of leg 12 with a resultant rotation of the louvers to the position shown in FIG. 3 in response to the insertion of spike 18. However, it is preferable for most applications to have louvers 14 initially angled downward towards the web portion of retainer 11. This would minimize the deformation of spike 18 and the rotation of louvers 14 in response to the insertion of the spike.

Similarly, it would be advantageous if the angle between louvers 14 and plane of leg 12 is less than 45° as indicated by angle $\alpha$ in FIG. 4. When the angle $\alpha$ is a small angle, a small upward movement of spike 18 relative to retainer 11 will produce a large lateral displacement of edge 27 of louver 14 as the louver is rotated in response to the movement of the spike. The large lateral displacement will produce substantial deformation of spike 18 and a large resulting lateral force. Conversely, if the value of $\alpha$ is large, a small movement of spike 18 will produce a small lateral displacement with a resulting small increase in the lateral force applied to the spike and cross-tie 24 by insert 11. For these reasons, it is recommended that the included angle $\beta$ between the louvers of each leg, as shown in FIG. 3, be kept at a value of less than 90°. This will both facilitate the insertion of spike 18 into insert 11 and maximize the increase in the lateral force applied to the spike in response to any backing out of the spike.

Insert 11 is readily fabricated with a punching or stamping operation which separates louvers 14 from the planar portion of leg 12 and web 15. The operation would leave sufficient unpunched or unstamped material at the ends of each louver 14 to form the connectors 16. The material of insert 11 could be a hardened steel since it is advantageous that edge 27 of louver 14 be harder than the material along the elongated shaft portion of spike 18 to permit deformation of the spike by the louver.

Although the preceding description has dealt exclusively with new installations where spike 18 and insert 11 are driven into cross-tie 24 simultaneously, my invention is equally applicable to the revitalization of existing railbeds. A spike that has no retaining insert is subject to the loosening of the spike in the hole it produces in a cross-tie when it is driven into place. In time the hole increases in size and the spike becomes loose. The resulting looseness can be remedied by removing the spike, and positioning a retaining insert between the sides of the old hole and the reinserted spike.

Throughout the foregoing description and in the drawing, the head portion of the inserted spike has been shown directly contacting the base of the rail. This is something of a simplification since a tie plate is frequently positioned between the base of the rail and the spike. Thus, both in the specification and the appended claims, when reference is made to the head of the spike engaging the base of the rail, it is understood that this engagement could be either direct or indirect. The indirect engagement would include the spike head engaging an extension of the rail, such as a tie plate.

It should be apparent that various alternatives and modifications could be devised by those skilled in the art without departing from the spirit and scope of my invention. For example, although louvers 14 and legs 12 were disclosed as being fabricated from a single piece by stamping or punching operation, they could also be assembled from individual pieces which were separately fabricated. Also, although insert 11 was disclosed as being harder than the material of the spike, that is not required for the whole of the insert. So long as edge 27 of louver 14 is harder than the spike, the purpose of my invention is accomplished. Thus, insert 11 could be fabricated from material softer than the spike and the edge of the louvers could then be hardened in a separate operation to permit the desired deformation of the spike. Similarly, although steel was indicated as the material of insert 11, that is suggestive only. Insert 11 could be fabricated from many other equally suitable materials depending upon the intended environment for using the insert.

Because upward movement of spike 18 is not prevented by insert 11, but merely results in an increase in the retaining force applied to the spike and an increase in the energy stored by the insert, the connection between the spike, the insert, and tie 24 is a resilient one. A nominal upward movement of spike 18 will be produced in response to the wave effect of the rolling load. However, as opposed to prior art arrangements, a subsequent downward movement of spike 18 will also result. Since the upward movement of spike 18 increases the forces exerted on, and by, insert 11, when the loading force producing the upward movement is removed, spike 18 will move back to its original position as the increased forces are dissipated. Thus, the connection is resilient enough to prevent work hardening of spike 18, yet secure enough to prevent the spike from backing out of tie 24.

I claim:

1. Apparatus for maintaining a fixed, yet resilient orientation between a railroad rail and a supporting cross-tie, the apparatus comprising, in combination:
   a. a load carrying rail including a flanged base;
   b. a penetrable cross-tie for supporting the flanged base of said rail;
   c. a spike for forceable insertion into said cross-tie, said spike including
      1. an elongated shaft; and
      2. an enlarged head portion located at one end of the elongated shaft for engaging the flanged base of said rail to secure said rail against substantial movement relative to said cross-tie; and
   d. retention means between the elongated shaft of said spike and the cross-tie into which said spike is forceably inserted for semiresiliently retaining said spike in fixed relationship to said cross-tie, said retention means including
      1. a pair of elongated planar legs;
      2. a reinforced web for connecting the legs to form a U-shaped structure corresponding generally to the configuration of opposing sides of the elongated shaft of said spike; and
      3. a plurality of spaced louvers disposed laterally across both legs for engaging the elongated shaft of said spike and said cross-tie, selected ones of said louvers including
         i. means for resiliently connecting the louver to a leg while permitting limited relative movement between the louver and the connected leg; and
         ii. an edge for deformably engaging the shaft of said spike.

2. Apparatus in accordance with claim 1 wherein each louver includes
   means for deforming both the elongated shaft of said spike and said cross-tie thereby applying a lateral force against said spike and said cross-tie to resist relative movement between said spike and said cross-tie.

3. Apparatus in accordance with claim 1 wherein the reinforced web includes
   a. an anvil for contacting the end of the elongated shaft opposite the enlarged head portion of said spike; and
   b. a ridged edge for more readily penetrating said cross-tie.

4. Apparatus in accordance with claim 3 wherein the anvil connects to the ridged edge so that impulse forces directed against the enlarged head portion of said spike are transmitted through said spike to the anvil and produce simultaneous penetration of said cross-tie by said spike and by said retention means.

5. Apparatus for maintaining a fixed, yet resilient orientation between a railroad rail and a supporting cross-tie, the apparatus comprising, in combination:
   a. a load carrying rail including a flanged base;
   b. a penetrable cross-tie for supporting the flanged base of said rail;
   c. a spike for forceable insertion into said cross-tie, said spike including
      1. an elongated shaft; and
      2. an enlarged head portion located at one end of the elongated shaft for engaging the flanged base of said rail to secure said rail against substantial movement relative to said cross-tie; and
   d. retention means between the the elongated shaft of said spike and the cross-tie into which said spike is forceably inserted for semi-resiliently retaining said spike in fixed relationship to said cross-tie, said retention means including
      1. a pair of elongated planar legs;
      2. a reinforced web for connecting the legs to form a U-shaped structure corresponding generally to the configuration of opposing sides of the elongated shaft of said spike; and 3. a plurality of spaced louvers disposed laterally across both legs for engaging the elongated shaft of said spike and said cross-tie, each of said louvers including
   i. means for resiliently connecting the louvers to the legs while permitting limited relative movement between each louver and its connected leg;
   ii. an inner edge for deformably engaging the shaft of said spike; and
   iii. an outer edge for deformably engaging said cross-tie.

6. Apparatus in accordance with claim 5 wherein the inner edge is harder than the elongated shaft of said spike, thereby permitting limited deformation at the surface of the elongated shaft of said spike.

7. Apparatus in accordance with claim 5 wherein the louvers disposed laterally across each leg are positioned parallel to each other and at an angle to the plane of the leg to locate the inner edge of each louver closer to the web than the outer edge of that louver, the included angle between louvers disposed across one leg and louvers disposed across the other leg thereby forming an angle less than 135°.

8. Apparatus in accordance with claim 7 wherein the included angle is an acute angle.

9. Apparatus in accordance with claim 7 wherein relative movement between the louvers and the legs produces a change in the angle between the louvers and the legs thereby changing the included angle between the louvers, the change in the included angle resulting in a proportional change in the lateral force applied against said spike and said cross-tie.

* * * * *